United States Patent
Thai et al.

(10) Patent No.: US 10,853,297 B2
(45) Date of Patent: Dec. 1, 2020

(54) METHOD FOR MAINTAINING MEMORY SHARING IN A COMPUTER CLUSTER

(71) Applicant: Mitac Computing Technology Corporation, Taoyuan (TW)

(72) Inventors: Thanh-Tu Thai, Taoyuan (TW); Hung-Tar Lin, Taoyuan (TW); Ching-Wen Hsu, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 0 days.

(21) Appl. No.: 16/740,853

(22) Filed: Jan. 13, 2020

(65) Prior Publication Data
US 2020/0233826 A1   Jul. 23, 2020

(30) Foreign Application Priority Data
Jan. 19, 2019  (TW) .............................. 108102115 A

(51) Int. Cl.
*G06F 13/40*  (2006.01)
*G06F 13/16*  (2006.01)

(52) U.S. Cl.
CPC ...... *G06F 13/4027* (2013.01); *G06F 13/1668* (2013.01); *G06F 2213/0026* (2013.01)

(58) Field of Classification Search
CPC ............. G06F 13/4027; G06F 13/4022; G06F 13/1668; G06F 13/14; G06F 13/102
See application file for complete search history.

(56) References Cited

U.S. PATENT DOCUMENTS

| | | | | | |
|---|---|---|---|---|---|
| 5,950,228 | A | * | 9/1999 | Scales | G06F 9/5016 711/147 |
| 8,700,856 | B2 | * | 4/2014 | Tanaka | G06F 3/0646 711/123 |
| 2010/0332756 | A1 | * | 12/2010 | Yarch | G06F 11/1666 711/119 |
| 2011/0167189 | A1 | * | 7/2011 | Matsubara | G06F 3/0658 710/308 |
| 2011/0202701 | A1 | * | 8/2011 | Maitra | G06F 13/4022 710/308 |
| 2011/0238909 | A1 | * | 9/2011 | Kumar | G06F 12/0866 711/114 |
| 2012/0110275 | A1 | * | 5/2012 | Ganti | G06F 12/08 711/153 |
| 2013/0254487 | A1 | * | 9/2013 | Tanaka | G06F 12/0808 711/123 |
| 2014/0075079 | A1 | * | 3/2014 | Tsai | G06F 13/4027 710/308 |

(Continued)

*Primary Examiner* — Raymond N Phan
(74) *Attorney, Agent, or Firm* — MLO, a professional corp.

(57) ABSTRACT

A method includes: by an application executed by a first node, determining whether a non-transparent bridge between the first node and a second node is in a disconnected state; sending a re-initialization request from the application to a driver executed by the first node when the NTB is in the disconnected state; re-initializing a memory of the first node upon the driver receiving the re-initialization request; transmitting a result message related to the re-initialization of the memory to the second node; and implementing a memory-sharing procedure upon completing the re-initialization of the memory and receiving, from the second node, another result message related to re-initialization of a memory of the second node.

17 Claims, 7 Drawing Sheets

(56) References Cited

U.S. PATENT DOCUMENTS

| | | | |
|---|---|---|---|
| 2015/0026384 A1* | 1/2015 | Maitra | G06F 13/4022 710/313 |
| 2015/0261709 A1* | 9/2015 | Billi | G06F 13/404 710/316 |
| 2017/0277655 A1* | 9/2017 | Das | G06F 3/0653 |
| 2018/0314666 A1* | 11/2018 | Tanaka | G06F 13/1668 |

* cited by examiner

METHOD FOR MAINTAINING MEMORY SHARING IN A COMPUTER CLUSTER

CROSS-REFERENCE TO RELATED APPLICATION

This application claims priority of Taiwanese Invention Patent Application No. 108102115, filed on Jan. 19, 2019.

FIELD

The disclosure relates to a method for a computer cluster, and more particularly to a method for maintaining memory sharing in a computer cluster.

BACKGROUND

A computer cluster is a set of plural computers, each computer being referred to as a node. When cooperating to complete computational tasks, nodes of a same computer cluster may share their own storage devices with each other (i.e., sharing memory spaces). Conventionally, memory sharing between two nodes may be achieved through a non-transparent bridge (NTB) that enables fast and frequent communication between the two nodes. Memory sharing between two nodes through an NTB in a computer cluster involves cooperation between firmware executed in Peripheral Component Interconnect Express (PCIe) switches of the two nodes and drivers related to the PCIe switches and executed in kernel spaces of operating systems (OSs) of the two nodes, and is set up during initialization of the computer cluster.

Said conventional memory sharing of a computer cluster may fail when one of the nodes is reset due to, for example, replacing the node with a new one, or rebooting or hot swapping the node, which breaks connection between the node and other nodes and also breaks the memory sharing set up during initialization of the computer cluster. However, the node (or another node that needs to access the memory space hosted by the node) does not have the ability to correct, such failure automatically.

SUMMARY

Therefore, an object of the disclosure is to provide a method that can alleviate at least one of the drawbacks of the prior art.

According to one aspect of the disclosure, a method for a computer cluster including a first node and a second node is provided. The first node includes a first central processing unit (CPU), a first memory and a first Peripheral Component interconnect Express (PCIe) switch. The second node includes a second memory and a second PCIe switch. The first CPU is to execute a first application in a user space of the first node, and to execute a first driver in a kernel space of the first node. The method includes steps of: by the first node executing the first application, determining whether a non-transparent bridge (NTB) between the first node and the second node is in a disconnected state, the NTB being configured to utilize the first PCIe switch and the second PCIe switch to allow the first node to access the second memory and to allow the second node to access the first memory; by the first node executing the first application, sending, when it is determined that the NTB is in the disconnected state, a re-initialization request from the first application to the first driver; by the first node executing the first driver, re-initializing the first memory upon the first driver receiving the re-initialization request; by the first node executing the first driver, generating a first result message related to the re-initialization of the first memory and transmitting the first result message to the second node; and by the first node executing the first driver, implementing a memory-sharing procedure upon completing the re-initialization of the first memory and receiving from the second node a second result message that is related to re-initialization of the second memory implemented by the second node.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
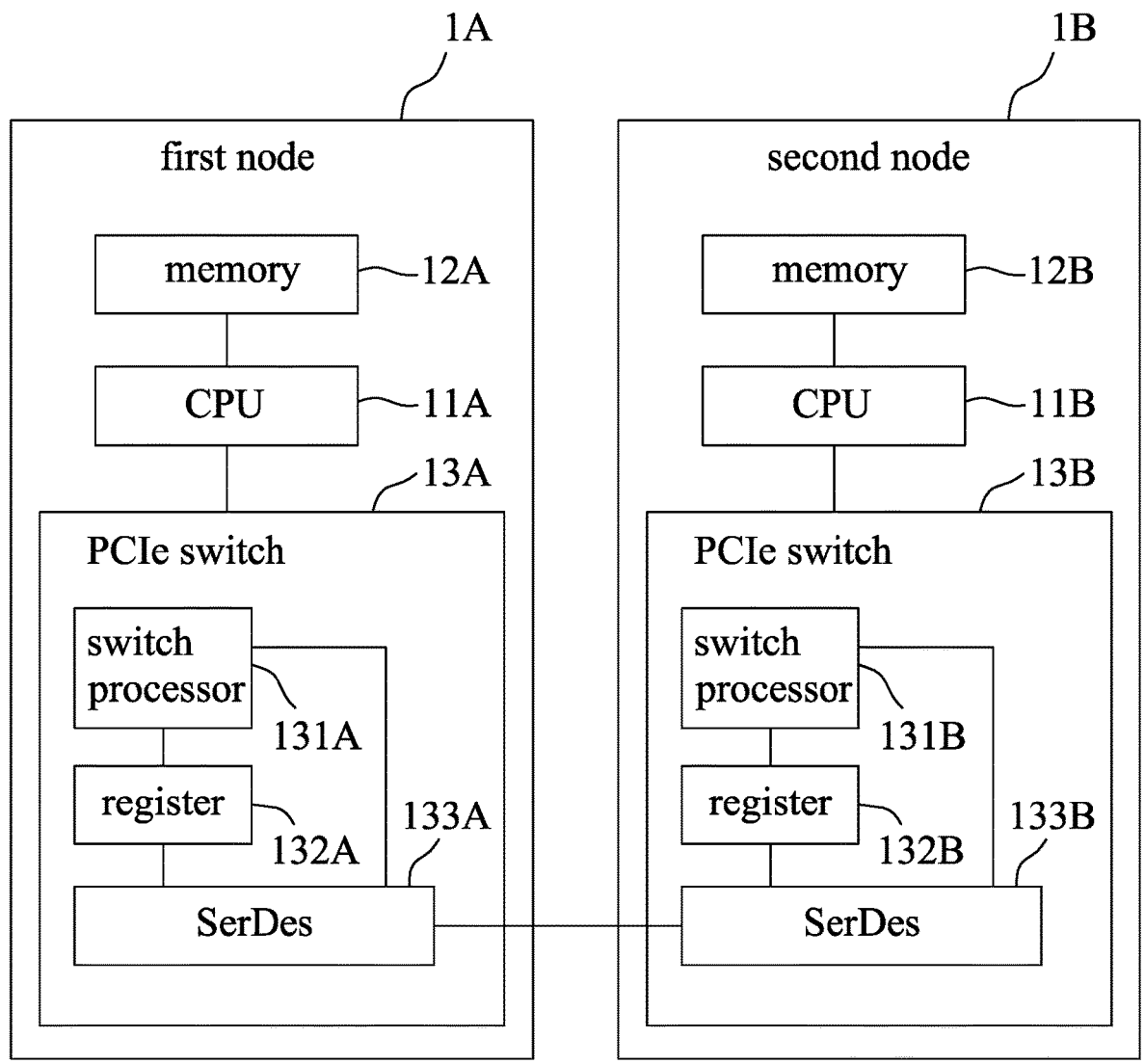
FIG. 1 is a block diagram exemplarily illustrating a computer cluster according to an embodiment.

Before the disclosure is described in greater detail, it should be noted that where considered appropriate, reference numerals or terminal portions of reference numerals have been repeated among, the figures to indicate corresponding or analogous elements, which may optionally have similar characteristics.

FIG. 1 is a block diagram exemplarily illustrating a first node 1A and a second node 1B of a computer cluster, wherein the first and second nodes 1A, 1B are peers (i.e., forming a peer-to-peer network) and are similar in architecture. Referring to FIG. 1, the first node 1A includes a first central processing unit (CPU) 11A, a first memory 12A electrically connected to the first CPU 11A, and a first Peripheral Component Interconnect Express (PCIe) switch 13A electrically connected to the first CPU 111A, and the second node 1B includes a second CPU 11B, a second memory 12B electrically connected to the second CPU 11B, and a second PCIe switch 13B electrically connected to the second CPU 11B. In particular, the first and second memories 12A, 12B may be main memories of the first and second nodes 1A, 1B, respectively. The first and second nodes 1A, 1B are connected to each other through a non-transparent bridge (NTB) between the first PCIe switch 13A and the second PCIe switch 13B so that the first and second nodes 1A, 1B may share their memory devices with each other (i.e., each of the first and second nodes 1A, 1B can access both of the first and second memories 12A, 12B). The first PCIe switch 13A includes a first switch processor 131A, a first register 132A electrically connected to the first switch processor 131A, and a first Serializer/Deserializer (SerDes) 133A electrically connected to the first switch processor 131A. The second PCIe switch 13B similarly includes a second switch processor 131B, a second register 132B electrically connected to the second switch processor 131B, and a second SerDes 133E electrically connected to the second switch processor 131B. According to some embodiments, the first register 132A may be physically connected with the first SerDes 133A, and the second register 132B may be physically connected with the second SerDes 133B. The first and second SerDes 133A, 133B may communicate with each other through a lane so as to establish the NTB between the first and second nodes 1A, 1B. In order for the first and second nodes 1A, 1B to share the memories 12A, 12B through the NTB, a memory-sharing procedure associated with the first and second nodes 1A, 1B was performed by each of the first and second nodes 1A, 1B during initialization of the computer cluster. Since the memory-sharing procedure is known, detailed description thereof is not provided herein for the sake of brevity.

Figure 2:
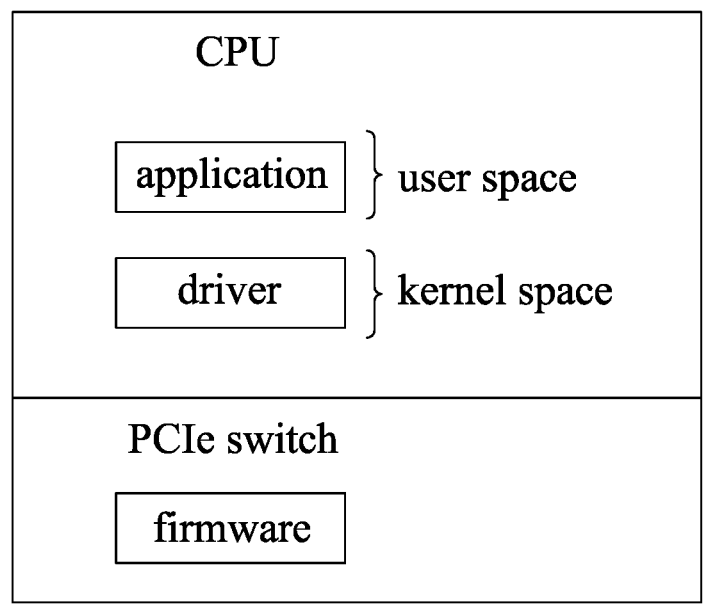
FIG. 2 is a block diagram exemplarily illustrating three software programs executed by a central processing unit or a Peripheral Component. Interconnect Express (PCIe) switch of a node in the computer cluster according to an embodiment.

According to an embodiment of the present disclosure, three programs will be executed in each of the first and second nodes 1A, 1B in order to implement a method for maintaining memory sharing between the first and second nodes 1A, 1B. According to the embodiment, as shown in FIG. 2, each of the first and second CPUs 11A, 11B is to execute an application and a driver, and each of the first and second switch processors 131A, 131B is to execute firmware. Specifically, the first CPU 111A is to execute a first application in a user space related to an operating system (OS) of the first node 1A and to execute a first driver related to the first PCIe switch 13A in a kernel space related to the OS of the first node 1A, and the first switch processor 131A is to execute first firmware. Similarly, the second CPU 11B is to execute a second application in a user space related to an OS of the second node 1B and to execute a second driver related to the second PCIe switch 13B in a kernel space related to the OS of the second node 1B, and the second switch processor 131E is to execute second firmware. In an embodiment, the first application and the first driver are stored in the first memory 12A, and the second application and the second driver are stored in the second memory 12B.

According to an embodiment of the present disclosure, two pieces of variable data are stored in the first memory 12A of the first node 1A, wherein one of said pieces of variable data (referred to as "variable data $VD_{A1}$" hereinafter) is to be periodically changed by the first node 1A at intervals of a first period. (referred to as "change period $CP_A$" hereinafter), and the other of said pieces of variable data (referred to as variable data $VD_{B1}$ hereinafter) is to be periodically changed by the second node 1B through the NTB at intervals of a second period (referred to as "change period $CP_B$" hereinafter). According to an embodiment of the present disclosure, the change period $CP_A$ and the change period $CP_B$ may be of the same length. Similarly, another two pieces of variable data are stored in the second memory 12B of the second node 1B, wherein one of said pieces of variable data (referred to as "variable data $VD_{A2}$" hereinafter) is to be periodically changed by the first node 1A through the NTB at intervals of the change period $CP_A$, and the other of said pieces of variable data (referred to as "variable data $VD_{B2}$" hereinafter) s to be periodically changed by the second node 1B at intervals of the change period $CP_B$. Each piece of the variable data $VD_{A1}$, $VD_{B1}$, $VD_{A2}$, $VD_{B2}$ stored in the first memory 12A or the second memory 12B may be, for example, a value, and the periodical change of the variable data may be, for example, an increment by one. The change of the variable data $VD_{A1}$ stored in the first, memory 12A and the change of the variable data $VD_{A2}$ stored in the second memory 12B may be implemented via a program executed by the first CPU 11A, and the change of the variable data $VD_{B1}$ stored in the first memory 12A and the change of the variable data $VD_{B2}$ stored in the second memory 12B may be implemented via a program executed by the second CPU 11B. In an embodiment, the variable data $VD_{B1}$ and the variable data $VD_{A2}$ are changed in response to instructions of the first application executed by the first CPU 11A, and the variable data $VD_{B1}$ and the variable data $VD_{B2}$ are changed in response to instructions of the second application executed by the second CPU 11B. In another embodiment, the variable data $VD_{B1}$ and the variable data $VD_{A2}$ are changed in response to instructions of the first driver executed by the first CPU 11A, and the variable data $VD_{B1}$ and the variable data $VD_{B2}$ are changed in response to instructions of the second driver executed by the second CPU 11B. According to some embodiments, the variable data $VD_{A1}$ stored in the first memory 12A and the variable data $VD_{A2}$ stored in the second memory 12B are to be synchronously changed by the first node 1A. That is, the variable data $VD_{A1}$ stored in the first memory 12A and the variable data $VD_{A2}$ stored in the second memory 12B would be identical when the first node 11A and the second node 1B are normally connected through the NTB. Similarly, the variable data $VD_{B1}$ stored in the first memory 12A and the variable data $VD_{B2}$ stored in the second memory 12B are to be synchronously changed by the second node 1B, and would be identical when the first node 1A and the second node 1B are normally connected.

Figure 3:
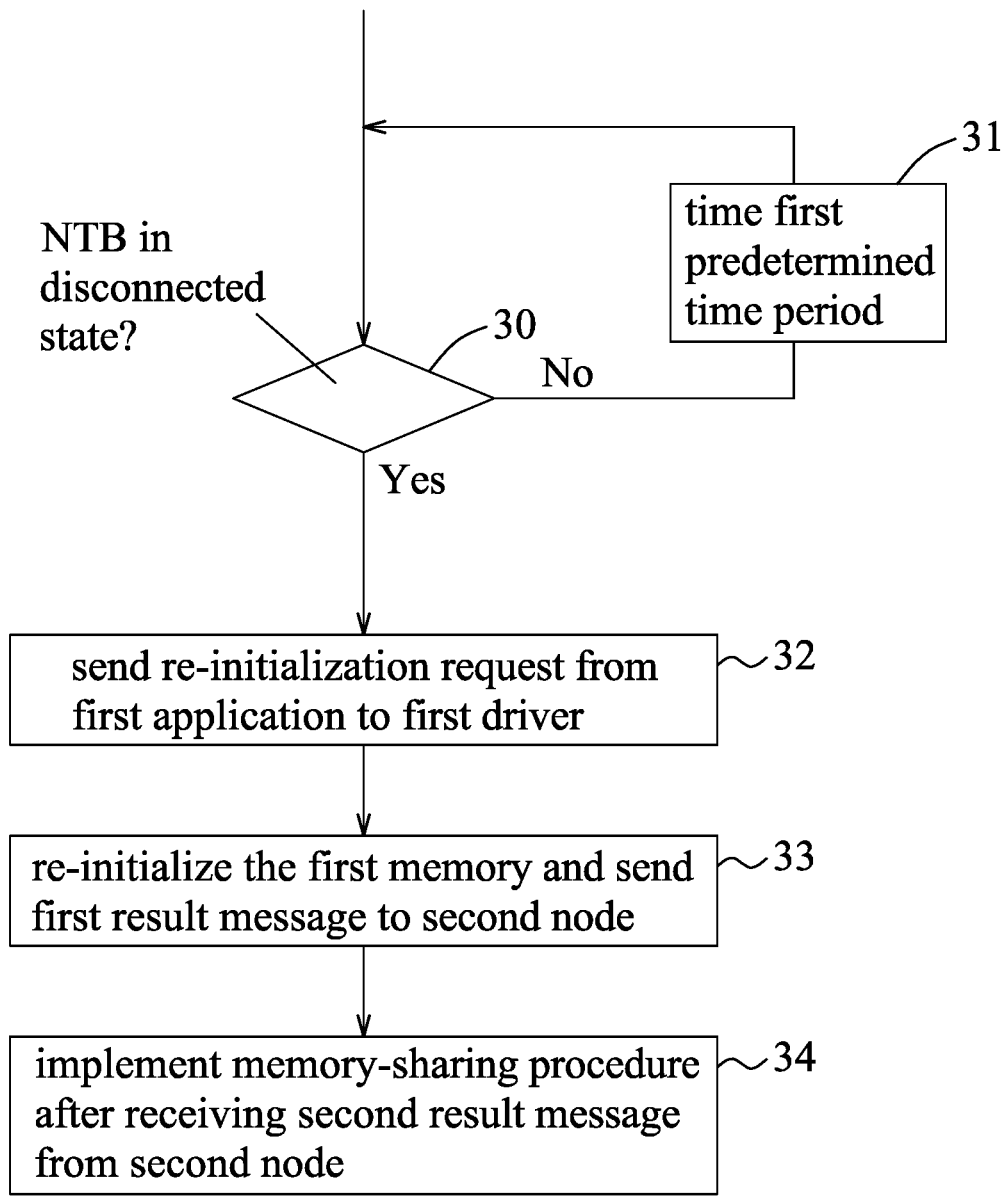
FIG. 3 is a flow chart exemplarily illustrating a method for maintaining memory sharing in a computer cluster according to an embodiment.

FIG. 3 exemplarily illustrates a method for maintaining memory sharing according to an embodiment of the present disclosure. The method can be performed by each of the first and second nodes 1A, 1B in order to maintain memory sharing with the other. The following description will be made from an aspect of the first node 1A performing the method.

Figure 4:
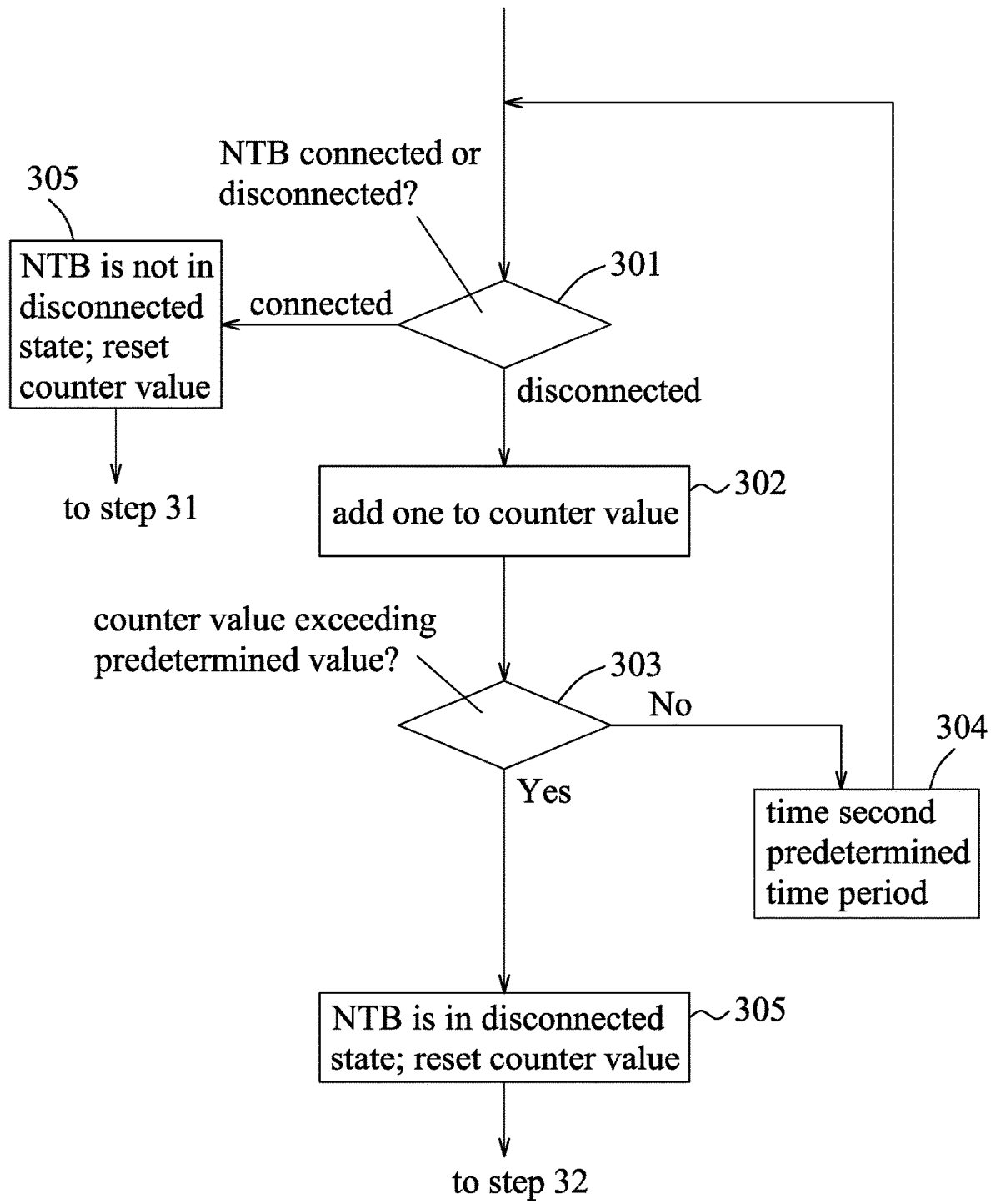
FIG. 4 is a flow chart exemplarily illustrating sub-steps of step 30 of the method shown in FIG. 3 according to an embodiment.

Referring to FIG. 3, in step 30, the first node 1A executes the first application to determine whether the NTB between the first node 1A and the second node 1B is in a disconnected state. If it is determined that the NTB is not in the disconnected state, which means that the NTB is in a connected state, the procedure goes to step 31 where the first node 1A times a first predetermined time period that is equal to or longer than the change period, and then goes back to step 30 (i.e., goes back to step 30 after the first predetermined time period has elapsed). On the other hand, if it is determined that the NTB is in the disconnected state, the procedure goes to step 32 (detailed description will be provided later). An implementation of step 30 includes sub-steps 301-305 as illustrated in FIG. 4, details of which will now be described.

In sub-step 301, the first node 1A executes the first application to determine whether the NTB is connected or disconnected. If it is determined that the NTB is connected, the procedure goes to step 305, in which the first node 1A determines that the NTB is not in the disconnected state and then executes the first application to reset a counter value. On the other hand, if it is determined that the NTB is disconnected, the procedure goes to step 302 (detailed description will be provided later). The determination made in step 301 may be carried out by any one of five procedures illustrated respectively in FIGS. 5-9.

Figure 5:
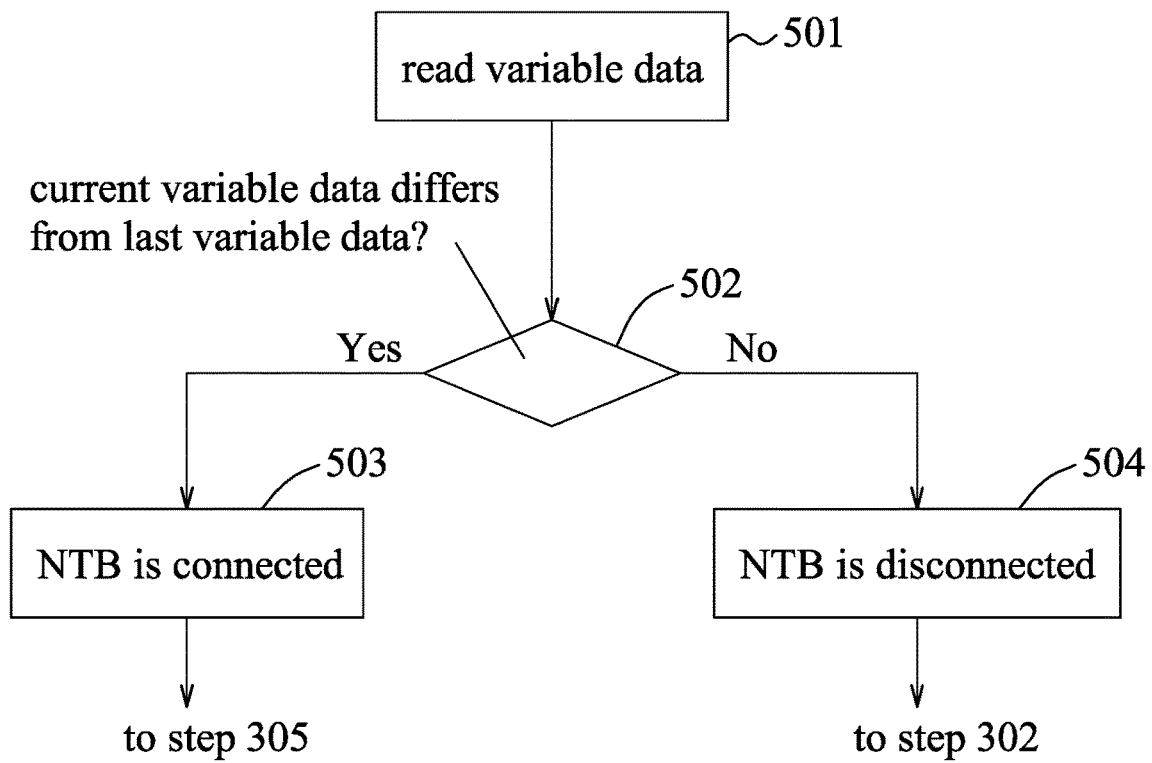
FIGS. 5-9 are flow charts each exemplarily illustrating a different implementation of sub-step 301 of FIG. 4 according to an embodiment.

FIG. 5 exemplary illustrates first implementation of sub-step 301 according an embodiment. The procedure illustrated in FIG. 5 is performed by the first CPU 11A executing the first application. In sub-step 501, the first node 1A reads the variable data $VD_{B1}$, which should have been changed by the second node 1B, from the first memory 12A. In sub-step 502, the first CPU 11A determines whether the variable data $VD_{B1}$ read from the first memory 12A at the current time point (also referred to as "current variable data $VD_{B1(c)}$" hereinafter) differs from the variable data $VD_{B1}$ read from the first memory 12A at a last time point (also referred to as "last variable data $VD_{B1(p)}$," hereinafter). If it is determined that the current variable data $VD_{B1(c)}$ is different from the last variable data $VD_{B1(p)}$, the procedure goes to sub-step 503, in which the first CPU 11A determines that the NTB is connected; otherwise, the procedure goes to sub-step 504, in which the first CPU 11A determines that the NTB is disconnected.

Figure 6:
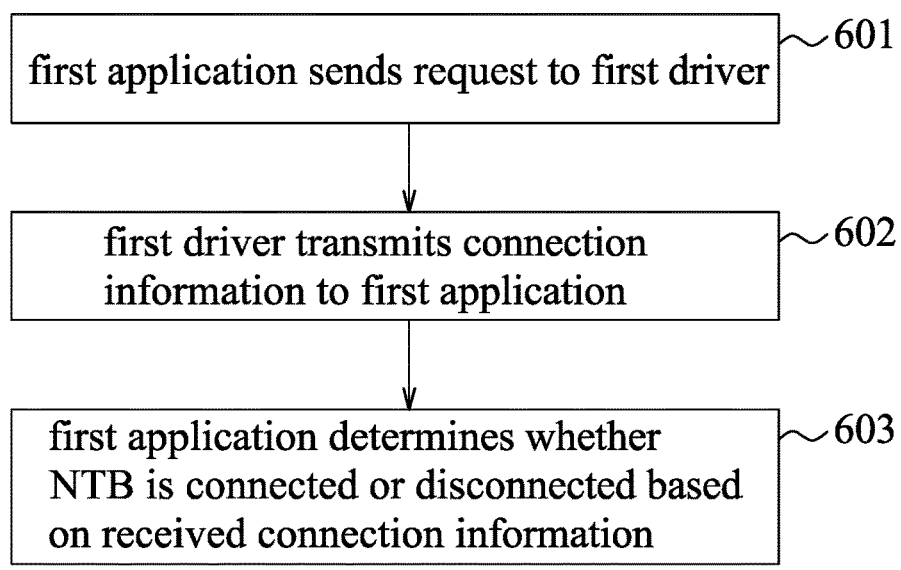

FIG. 6 exemplarily illustrates a second implementation of sub-step 301 according to an embodiment of this disclosure. The procedure illustrated in FIG. 6 is performed by the first CPU 11A executing the first application and the first driver that communicate with each other. In sub-step 601, the first application sends a request for connection information to the first driver, wherein the connection information is indicative of whether the NTB is connected or disconnected. In sub-step 602, the first driver generates and transmits the connection information to the first application upon receiving the request. According to an embodiment, the first driver reads the variable data $VD_{B1}$ from the first memory 12A upon receiving the request, determines whether the variable data $VD_{B1}$ read from the first memory 12A at the current time point (i.e., the current variable data $VD_{B1(c)}$) differs from the variable data $VD_{B1}$ read from the first memory 12A at a last time point (i.e., the last variable data $VD_{B1(p)}$), and then generates the connection information based on the current, variable data $VD_{B1(c)}$ and the last variable data $VD_{B(p)}$. When it is determined that the current variable data $VD_{B1(c)}$ is different from the last variable data $VD_{B1(p)}$, the connection information thus generated indicates that the NTB is connected. In the contrary, when it is determined that the current variable data $VD_{B1(c)}$ is not different from (i.e., is the same as) the last variable data $VD_{B1(p)}$, the connection information thus generated indicates that the NTB is disconnected. In sub-step 603, the first application receives the connection information from the first driver, and determines whether the NTB is connected or disconnected based on the connection information thus received.

In a similar embodiment, the first driver does not read the variable data $VD_{B1}$ from the first memory 12A in response to receipt of the request in sub-step 602, but periodically reads the variable data $VD_{B1}$ and records most recent two pieces of the variable data $VD_{B1}$ thus read at intervals of a third period (referred to as "read period" hereafter). The read period $RP_A$, is not smaller than the change period $CP_B$ related to the rate the second node 1B changes the variable data $VD_{B1}$ stored in the first memory 12A. In this embodiment, the connection information may be generated based on, for example, the most recent two pieces of the variable data $VD_{B1}$ updated by the first driver to reflect real-time connection/disconnection status of the NTB by comparing the most recent two pieces of the variable data $VD_{B1}$ each time the first driver reads the variable data $VD_{B1}$. To be specific, when the first driver determines that the most recent two pieces of the variable data $VD_{B1}$ are different, the connection information generated based thereon indicates that the NTB is connected; when the most recent two pieces of the variable data $VD_{B1}$ are the same, the connection information is generated to indicate that the NTB is disconnected. In this way, when the first driver receives the request from the first application, the first driver may readily read and send the pre-stored connection information to the first application information may be a non-pre-stored information, but freshly generated and sent upon receiving the request by reading and comparing the most recent two pieces of the variable data $VD_{B1}$.

Figure 7:
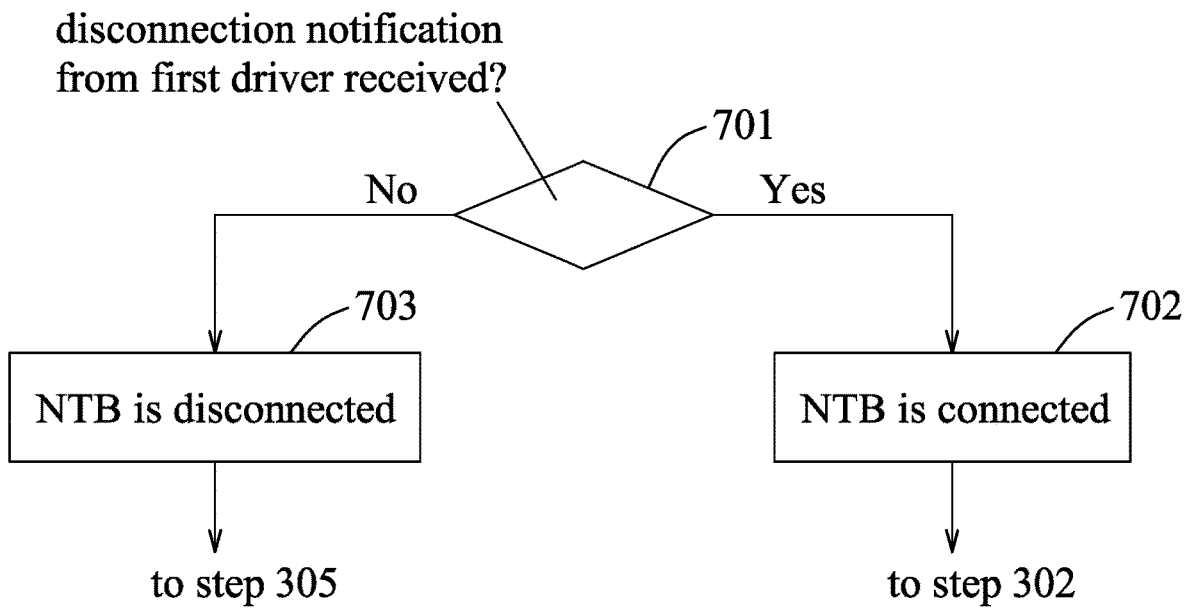

FIG. 7 exemplarily illustrates a third implementation of sub-step 301 according to an embodiment of this disclosure. The procedure illustrated in FIG. 7 is performed by the first CPU 11A executing the first application. In sub-step 701, the first application determines whether a disconnection notification from the first driver is received. If the disconnection notification is received, the procedure goes to sub-step 702, in which the first CPU 11A determines that the NTB is disconnected; otherwise, the procedure goes to sub-step 703, in which the first CPU 11A determines that the NTB is connected. In particular, in this embodiment, the first driver periodically (with the read period) reads the variable data $VD_{B1}$ from the first memory 12A, and determines whether the variable data $VD_{B1}$ read at the current time point differs from the variable data $VD_{B1}$ read at a last time point. Once the first driver determines that the variable data $VD_{B1}$ of the current time point is the same as the variable data $VD_{B1}$ of the last time point, the first driver would send the disconnection notification to the first application.

Figure 8:
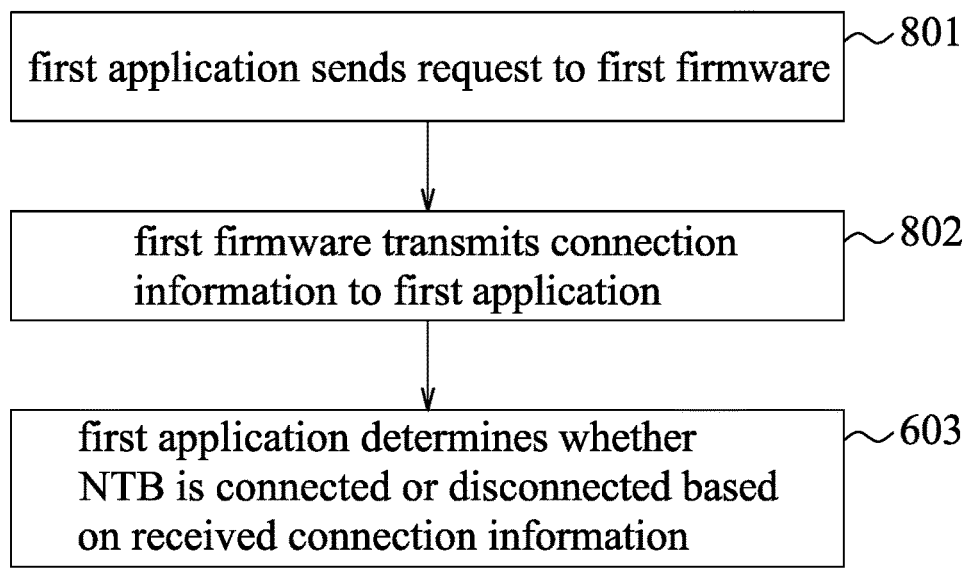

FIG. 8 exemplarily illustrates a fourth implementation of sub-step 301 according to an embodiment of this disclosure. The procedure illustrated in FIG. 8 is performed by the first CPU 11A executing the first application and the first driver that communicate with each other, and by the first PCIe switch 13A executing the first firmware. In sub-step 801, the first application sends a request for connection information to the first firmware through the first driver, wherein the connection information is indicative of whether the NTB is connected or disconnected. In sub-step 802, the first firmware generates and transmits the connection information to the first application through the first driver upon receiving the request e According to an embodiment, the connection information is generated based on data that is stored in the first register 132A and that has been manipulated by the first switch processor 131A to indicate connection/disconnection of the NTB. In an embodiment, the first switch processor 131A simply reads the status data from the first register 132A and then sends the status data as the connection information to the first application through the first driver. In sub-step 803, the first application receives the connection information from the first firmware, and determines whether the NTB is connected or disconnected based on the connection information thus received.

Figure 9:
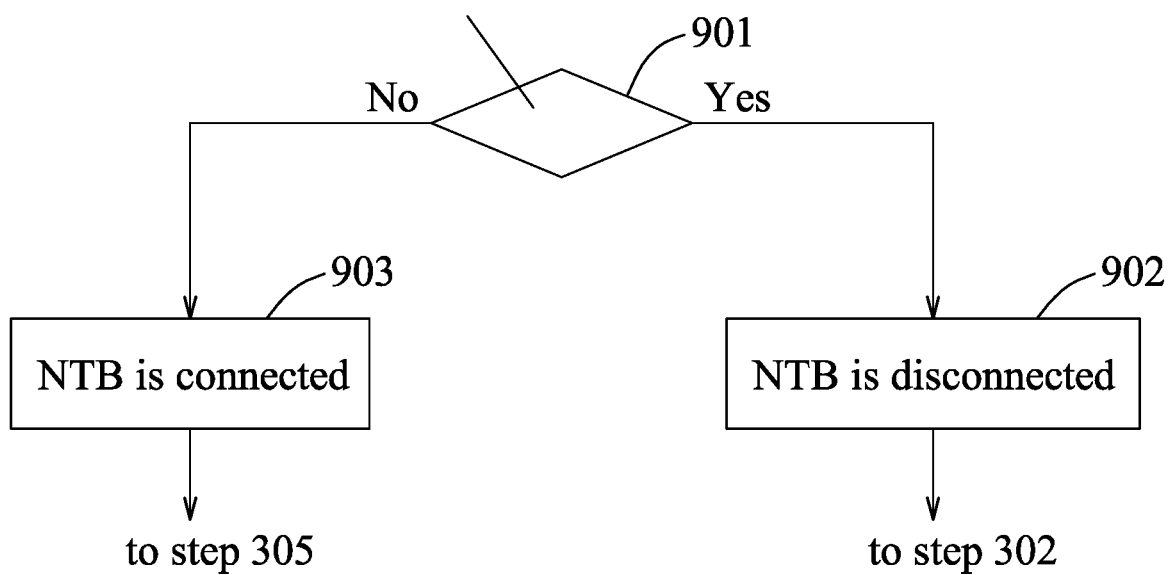

FIG. 9 exemplarily illustrates a fifth implementation of step 301 according to an embodiment. The procedure illustrated in FIG. 9 is performed by the first CPU 11A executing the first application. In step 901, the first application determines whether a disconnection notification from the first firmware is received. If the disconnection notification is received, the procedure goes to sub-step 902, in which the first CPU 11A determines that the NTB is disconnected; otherwise, the procedure goes to sub-step 903, in which the first CPU 11A determines that the NTB is connected. To be specific, in this embodiment, the first firmware periodically (with the read period or the change period) reads the status data from the first register 132A, and determines whether the status data indicates that the NTB is disconnected. Once the first firmware determines that the status data thus read indicates that the NTB is disconnected, the first firmware sends the disconnection notification to the first application through the first driver.

Turning back to FIG. 4, in sub-step 302 to which the procedure goes when it is determined in sub-step 301 that the NTB is disconnected, the first node 1A executes the first application to add one to the counter value. Then, in sub-step 303, the first node 1A executes the first application to determine whether the counter value exceeds a predetermined value. If it is determined that the counter value exceeds the predetermined value, the procedure goes to sub-step 305, in which the first node 1A determines that the NTB is in the disconnected state and then executes the first application to reset the counter value. On the other hand, if it is determined that the counter value does not exceed the predetermined value, the procedure goes to sub-step 304 in which the first node 1A times a second predetermined time period, and then goes back to sub-step 301 when the second predetermined time period has elapsed. According to some embodiments, the second predetermined time period may equal the read period, and the predetermined value may be an integer larger than or equal to two. For example, the predetermined value may be two or three.

It is noteworthy that the method of the present disclosure is advantageous in that it avoids overreaction to temporary disconnection of the NTB by introducing the determination of whether the counter value exceeds the predetermined value into, the determination of whether the NTB is in the disconnected state or not. Temporary disconnection of the NTB may be caused by unstable hardware and is generally automatically recovered soon. For example, the NTB that is currently and temporarily disconnected may be determined to be disconnected in a first iteration of sub-step 301, and then after waiting for the second predetermined time period in sub-step 303, the NTB may be determined to be connected in a second iteration of sub-step 301 because the NTB has automatically recovered during the waiting time of sub-step 303. The disclosed method that leaves temporary disconnection of the NTB to its automatic recovery can save processing resources.

Referring to FIG. 3 again, when it is determined in step 30 that the NTB is in the disconnected state, the procedure goes to step 32. In step 32, the first node 1A executing the first application sends a re-initialization request to the first driver in order to trigger the first driver to re-initialize the first memory 12A.

In step 33, the first node 1A executes the first driver to re-initialize the first memory 12A in response to the first driver receiving the re-initialization request, generates a first result message related to re-initialization of the first memory 12A (performed in response to the re-initialization request) after said re-initialization completes, and transmits the first result message to the second node 1B.

In step 34, when the first node 1A has completed the re-initialization of the first memory 12A and received a second result message related to re-initialization of the second memory 12B from the second node 1B, the first node 1A executes the first driver to implement the memory-sharing procedure that is associated with the first and second nodes 1A, 1B and that was once performed by the first node 1A during initialization of the computer cluster. The second result message is generated and transmitted by the second node 1B after the second node 1B has re-initialized the second memory 12B when, for example, the second node 1B performs the same procedure of steps 30-33 and detects the NTB in the disconnected state, or after the second node 1B has been reset (because of, e.g., replacing the second node 1B with a new one, rebooting the second node 1B, or hot swapping the second node 1B). Similarly, when the second node 1B has completed the re-initialization of the second memory 12B and received the first result message from the first node 1A, the second node 1B also executes the second driver to implement the memory-sharing procedure that is associated with the first and second nodes 1A, 1B and that was once performed by the second node 1B. After (and only after) both of the first and second nodes 1A, 1B have re-initialized their own memories 12A, 12B and completed the memory-sharing procedures, the NTB between the first and second nodes 1A, 1B returns to a normal, connected state, and the first and second nodes 1A, 1B may continue to share their memories 12A, 12B with each other through the NTB.

It can be appreciated that a computer cluster utilizing the disclosed method for maintaining memory sharing may automatically recover from a failure in memory sharing that is caused by a node of the computer cluster being reset (due to, e.g., replacing the node with a new one, rebooting the node, or hot swapping the node). Specifically, said failure stems from an NTB between the node and another node of the computer cluster entering a disconnected state, which can be automatically detected by the disclosed method through executing applications or drivers in CPUs of the node and the another node to regularly read variable data stored in memories of the node and the another node, respectively, or through regularly inquiring firmware executed in the PCIe switches of the node and the another node about connection information related to the NTB between the node and the another node. Once the NTB is detected to be in the disconnected state, the disclosed method would cause the node and the another node to automatically re-initialize their memories, and then implement the memory-sharing procedure that is associated with the first and second nodes 1A, 1B and that was once performed during initialization of the computer cluster, such that memory sharing between the node and the another node may resume.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for maintaining memory sharing in a computer cluster including a first node and a second node, the first node including a first central processing unit (CPU), a first memory and a first Peripheral Component Interconnect Express (PCIe) switch, the second node including a second memory and a second PCIe switch, the first CPU executing a first application in a user space of the first node, the first CPU further executing a first driver in a kernel space of the first node, the method comprising steps of:

by the first node executing the first application, determining whether a non-transparent bridge (NTB) between the first node and the second node is in a disconnected state, the NTB being configured to utilize the first PCIe switch and the second PCIe switch to allow the first node to access the second memory and to allow the second node to access the first memory;

by the first node executing the first application, sending, when it is determined that the NTB is in the disconnected state, a re-initialization request from the first application to the first driver;

by the first node executing the first driver, re-initializing the first memory upon the first driver receiving the re-initialization request;

by the first node executing the first driver, generating a first result message related to the re-initialization of the first memory and transmitting the first result message to the second node; and by the first node executing the first driver, implementing a memory-sharing procedure upon completing the re-initialization of the first memory and receiving from the second node a second result message that is related to re-initialization of the second memory implemented by the second node.

2. The method of claim 1, further comprising steps of:

by the first node, timing a predetermined time period upon determining that the NTB is not in the disconnected state; and repeating the step of determining whether the NTB between the first node and the second node is in the disconnected state when the predetermined time period has elapsed.

3. The method of claim 1, wherein the step of determining whether the NTB between the first node and the second node is in the disconnected state includes steps of:

determining whether the NTB is connected or disconnected;

when it is determined that the NTB is disconnected, adding one to a counter value, and determining whether the counter value exceeds a predetermined value; and when it is determined that the counter value exceeds the predetermined value, determining that the NTB between the first node and the second node is in the disconnected state.

4. The method of claim 1, the second node further including a second CPU that executes a second driver in a kernel space of the second node and a second application in a user space of the second node, the method further comprising steps of:

by the second node executing the second driver, re-initializing the second memory when the second node determines that the NTB is in the disconnected state;

by the second node executing the second driver, generating the second result message related to the re-initialization or the second memory and transmitting the second result message to the first node; and by the second node executing the second driver, cooperating with the first node to implement the memory-sharing procedure so as to allow the first node and the second node to respectively access the second memory and the first memory.

5. The method of claim 1, wherein the step of determining whether the NTB between the first node and the second node is in the disconnected state includes steps of:

determining whether the NTB is connected or disconnected;

when it is determined that the NTB is disconnected,
adding one to a counter value,
determining whether the counter value exceeds a predetermined value,
when it is determined that the counter value exceeds the predetermined value, determining that the NTB between the first node and the second node is in the disconnected state, and resetting the counter value, and
when it is determined that the counter value does not exceed the predetermined value, timing a first predetermined time period, and repeating the step of determining whether the NTB is connected or disconnected when the first predetermined time period has elapsed;

when it is determined that the NTB is connected,
determining that the NTB is not in the disconnected state,
resetting the counter value,
timing a second predetermined time period, and repeating the step of determining whether the NTB is connected or disconnected when the second predetermined time period has elapsed.

6. The method of claim 3, wherein the step of determining whether the NTB between the first node and the second node is in the disconnected state further includes a step of:

when it is determined that the NTB is connected, determining that the NTB is not in the disconnected state and resetting the counter value.

7. The method of claim 3, wherein the step of determining whether the NTB between the first node and the second node is in the disconnected state further includes a step of resetting the counter value when it is determined that the counter value exceeds the predetermined value.

8. The method of claim 3, wherein the step of determining whether the NTB between the first node and the second node is in the disconnected state further includes a step of:

when it is determined that the counter value does not exceed the predetermined value,
timing a predetermined time period, and
repeating the step of determining whether the NTB is connected or disconnected when the predetermined time period has elapsed.

9. The method of claim 3, wherein the step of determining whether the NTB is connected or disconnected includes:

by the first node executing the first application, determining that the NTB is disconnected based on a notification transmitted from the first driver to the first application, the notification indicating that the NTB is disconnected.

10. The method of claim 3, the first PCIe switch executing firmware, wherein the step of determining whether the NTB is connected or disconnected includes:

by the first node executing the first application sending a request for connection information to the firmware through the first driver, the connection information indicating whether the NTB is connected or disconnected;

by the first node executing the firmware, transmitting the connection information to the first application through the first driver upon the firmware receiving the request; and by the first node executing the first application, determining whether the NTB is connected or disconnected based on the connection information thus received.

11. The method of claim 3, the first PCIe switch executing firmware, wherein the step of determining whether the NTB is connected or disconnected includes:
by the first node executing the first application, determining that the NTB is disconnected based on a notification transmitted from the firmware to the first application, the notification indicating that the NTB is disconnected.

12. The method of claim 6, further comprising steps of:
by the first node, timing a predetermined time period when it is determined that the NTB is not in the disconnected state; and
repeating the step of determining whether the NTB is connected or disconnected when the predetermined time period has elapsed.

13. The method of claim 8, the first memory storing first variable data that is to be periodically changed by the second node at intervals of a first period while the NTB is connected, the first period being not longer than the predetermined time period, wherein the step of determining whether the NTB is connected or disconnected includes:
by the first CPU executing the first application, reading the first variable data from the first memory at a current time point;
by the first CPU executing the first application, determining whether the first variable data read from the first memory at the current time point differs from the first variable data read from the first memory at a last time point; and
by the first CPU executing the first application, determining whether the NTB is connected or disconnected based on the determination as to whether the first, variable data read from the first memory at the current time point differs from the first variable data read from the first memory at the last time point.

14. The method of claim 8, wherein the step of determining whether the NTB is connected or disconnected includes steps of:
by the first node executing the first application, sending a request for connection information to the first driver, the connection information indicating whether the NTB is connected or disconnected;
by the first node executing the first driver, transmitting the connection information to the first application upon the first driver receiving the request; and
by the first node executing the first application, determining whether the NTB is connected or disconnected based on the connection information thus received.

15. The method of claim 9, the first memory storing variable data that is to be periodically changed by the second node at intervals of a period while the NTB is connected, period being not longer than the predetermined time period, the method further comprising steps of:
by the first node executing the first driver, periodically reading the variable data from the first memory;
by the first node executing the first driver, generating the notification when the first driver determines that the variable data read from the first memory at a current time point is the same as the variable data read from the first memory at a last time point; and
by the first node executing the first driver, transmitting the notification thus generated to the first application.

16. The method of claim 13, the first memory further storing second variable data that is to be periodically changed by the first node at intervals of a second period that is not longer than the predetermined time period, the second memory storing third variable data that is to be periodically changed by the first node at intervals of the second period while the NTB is connected, and fourth variable data that is to be periodically changed by the second node at intervals of the first period, the method further comprising a step of:
by the first CPU executing the first application, changing a value of the second variable data stored in the first memory, and synchronously changing a value of the third variable data stored in the second memory while the NTB is connected in order to maintain consistency of the second variable data and the third variable data.

17. The method of claim 14, the first memory storing variable data that is to be periodically changed by the second node at intervals of a period while the NTB is connected, the period being not longer than the predetermined time period, wherein the step of transmitting the connection information includes:
by the first node executing the first driver, reading the variable data from the first memory at a current time point;
by the first CPU executing the first driver, generating, upon the first driver receiving the request for connection information, the connection information based on whether the variable data read from the first memory at the current time point differs from the variable data read from the first memory at a last time point or not; and
by the first CPU executing the first driver, transmitting the connection information thus generated to the first application.

* * * * *